Patented Nov. 15, 1938

2,136,791

UNITED STATES PATENT OFFICE 2,136,791

WORKING FLUID FOR ABSORPTION REFRIGERATING MACHINES

Joseph Fleischer, East Alton, Ill., assignor to Servel, Inc., New York, N. Y., a corporation of Delaware No Drawing. Application October 18, 1937, Serial No. 169,644

8 Claims. (Cl. 252—5)

This invention relates to refrigeration, and more particularly to chemical working fluids for use in absorption refrigerating machines.

One of the main disadvantages attending the use of the combination of water and ammonia as the workng fluid in the absorption refrigerating machines is the necessity for rectifying the ammonia vapor liberated in the generator; i. e., the volatility of water is sufficiently high to produce concentrations of water vapor in the vapor liberated in the generator, which prove troublesome unless the greater part of the water vapor is removed.

An object of my invention is to make available for use in absorption refrigerating machines a new type of working fluid in which the absorbent liquid is sufficiently nonvolatile to eliminate the necessity for rectifying the vapor liberated in the generator. The working fluids which I provide include a low boiling organic compound containing carbon, hydrogen and oxygen—preferably only these elements—and characterized by an (—OR) group linked to a carbon atom where R is an aliphatic hydrocarbon radical, as a refrigerant and a simple phenol or a mixture of simple phenols as an absorbent. More specifically, as refrigerants I provide ethers and esters with normal boiling points below 65° C., and as absorbent materials the simple phenols, or mixtures of simple phenols having freezing points below 25° C. By simple phenols I refer, according to the general definition, to compounds containing one or more hydroxyl groups attached to an aromatic hydrocarbon nucleus.

I have found that solutions of ethers and/or esters, as above specified, in phenols, as above specified, display large negative deviations from Raoult's Law. Furthermore, I have found that such ethers and esters are absorbed in and liberated from such phenols in amounts sufficient to produce practical and efficient refrigeration.

As a specific example of my invention, a working fluid may consist of dimethyl ether, having the formula $CH_3OCH_3$, as the refrigerant, and cresylic acid, which is a commercially obtainable mixture of simple phenols, as the absorbent.

The preferred working composition of this working fluid is thirty percent by weight of dimethyl ether, although a variation of plus or minus five percent of dimethyl ether would not seriously impair the efficiency of the working fluid.

As a second example of my invention, the working fluid may consist of methyl formate, having the formula $HCOOCH_3$, as the refrigerant, and cresylic acid as the absorbent. The preferred working composition of this working fluid is twenty-seven, plus or minus five, percent by weight of methyl formate.

Other ethers and esters, of the composition and properties specified above, may likewise serve as refrigerant, e. g., methyl ethyl, ethyl, methyl propyl, ethyl propyl, methyl isopropyl, isopropyl, ethyl isopropl and vinyl ethers, and ethylene oxide, propylene oxide, methylol, furane, methyl acetate and ethyl formate, and other phenols, or mixtures of phenols, as above specified, may serve as absorbent, e. g., phenol and ortho, meta and para cresols in technical condition and having a freezing point below 25° C. Furthermore, mixtures of different ethers of the kind specified, or of different esters of the kind specified, or of an ether or ethers with an ester or esters may serve as refrigerant.

While I have given certain specific examples of working fluids, it should be understood that my invention includes any working fluid consisting of a low boiling ether or ester, coming within the composition and properties specified, as a refrigerant and a simple phenol or mixture of simple phenols, as above specified, as an absorbent.

This application is a continuation in part of my co-pending application Serial No. 698,491, filed November 17, 1933.

Having described my invention what I claim as new and desire to secure by Letters Patent is:

1. A working fluid for absorption refrigerating machines comprising as a refrigerant a member of the group consisting of ethers and esters, said compounds having a boiling point below 65° C., and as an absorbent a mixture of simple phenols having a freezing point below 25° C.

2. A working fluid, as called for in claim 1, in which the refrigerant consists of an ether.

3. A working fluid, as called for in claim 1, in which the refrigerant consists of an ester.

4. A working fluid, as called for in claim 1, in which the absorbent consists of a simple phenol, having a freezing point below 25° C.

5. A working fluid, as called for in claim 1, in which the refrigerant is dimethyl ether.

6. A working fluid, as called for in claim 1, in which the refrigerant is dimethyl ether and the absorbent is cresylic acid.

7. A working fluid, as called for in claim 1, in which the refrigerant is methyl formate.

8. A working fluid, as called for in claim 1, in which the refrigerant is methyl formate and the absorbent is cresylic acid.

JOSEPH FLEISCHER.